(12) United States Patent
Fang et al.

(10) Patent No.: US 12,501,196 B2
(45) Date of Patent: Dec. 16, 2025

(54) VIBRATION SENSOR MODULE AND ELECTRONIC DEVICE

(71) Applicant: GOERTEK MICROELECTRONICS INC., Qingdao (CN)

(72) Inventors: Huabin Fang, Qingdao (CN); Luyu Duanmu, Qingdao (CN)

(73) Assignee: GOERTEK MICROELECTRONICS INC., Qingdao (CN)

( * ) Notice: Subject to any disclaimer, the term of this patent is extended or adjusted under 35 U.S.C. 154(b) by 258 days.

(21) Appl. No.: 18/307,411

(22) Filed: Apr. 26, 2023

(65) Prior Publication Data

US 2023/0269506 A1   Aug. 24, 2023

Related U.S. Application Data

(63) Continuation of application No. PCT/CN2021/125309, filed on Oct. 21, 2021.

(30) Foreign Application Priority Data

Oct. 27, 2020   (CN) .......................... 202022432156.0

(51) Int. Cl.
*H04R 1/08* (2006.01)
*H04R 1/04* (2006.01)
*H04R 3/00* (2006.01)

(52) U.S. Cl.
CPC ................. *H04R 1/08* (2013.01); *H04R 1/04* (2013.01); *H04R 3/00* (2013.01)

(58) Field of Classification Search
None
See application file for complete search history.

(56) References Cited

U.S. PATENT DOCUMENTS 10,999,684 B1 * 5/2021 Wan ....................... H04R 17/02
2017/0280218 A1    9/2017 Wang et al.
(Continued)

FOREIGN PATENT DOCUMENTS

CN    210464558 U    5/2020
CN    111510834 A    8/2020
(Continued)

OTHER PUBLICATIONS

International Search Report and Written Opinion issued in International Application No. PCT/CN2021/125309; mailed Jan. 7, 2022; 13 pgs.

(Continued)

*Primary Examiner* — Fan S Tsang
(74) *Attorney, Agent, or Firm* — HAUPTMAN HAM, LLP

(57) ABSTRACT

A vibration sensor module including: a substrate, a first casing, a vibration pickup unit, and a sensor unit. The first casing has an open end on the substrate, the first casing and the substrate are enclosed to form a sealing chamber, and the first casing includes a first top plate opposite to the substrate. The vibration pickup unit is arranged in the sealing chamber, the vibration pickup unit includes a second casing with an open end and an elastic vibration pickup member arranged in the second casing, the open end of the second casing is arranged on the substrate or the first top plate, and the second casing is provided with a vibration transmission through hole. The sensor unit includes a sensor chip arranged on an outer surface of the second casing, and a back cavity of the sensor chip corresponds to the vibration transmission through hole.

11 Claims, 4 Drawing Sheets

(56) References Cited

U.S. PATENT DOCUMENTS

2018/0149538 A1    5/2018  Gritti et al.
2019/0174233 A1    6/2019  Fukuda

FOREIGN PATENT DOCUMENTS

CN      111556419  A    8/2020
WO     2015096434 A1   7/2015

OTHER PUBLICATIONS

Extended Search Report in Corresponding European Application No. 21885026.1, mailed Oct. 1, 2024; 8 pgs.

* cited by examiner

VIBRATION SENSOR MODULE AND ELECTRONIC DEVICE

CROSS-REFERENCE TO RELATED APPLICATIONS

This application is a continuation application of International Application No. PCT/CN2021/125309, filed on Oct. 21, 2021, which claims priority to Chinese Patent Application No. 202022432156.0, filed on Oct. 27, 2020. The disclosures of the applications are incorporated herein by reference in their entireties.

TECHNICAL FIELD

The present disclosure relates to the technical field of bone conduction, and in particular to a vibration sensor module and an electronic device.

BACKGROUND

The vibration sensor collects and converts the sound signal into the electrical signal through the slight vibration of the head and neck bones when people talk. Different from traditional microphones that collect sound through the air conduction, the vibration sensor can transmit the sound with high-definition even in a very noisy environment. In many occasions such as a fire scene, firefighters wearing the anti-poison gear cannot speak directly into the microphone, so the vibration sensor can be used. With the development of electronic products, the vibration sensor is more and more widely used.

In the related art, the vibration sensor includes a vibration pickup unit and a sensor unit, and the vibration pickup unit is used to collect an external vibration signal from the outside world and transmit the external vibration signal to the sensor unit, and the sensor unit is used to convert the vibration signal into an electrical signal. The sensor unit includes a sealing casing and a sensor chip arranged in the sealing casing, the vibration pickup unit includes a vibration pickup casing with an open end and a vibration pickup film arranged in the vibration pickup casing, and the open end of the vibration pickup casing is arranged on an outer surface of the sealing casing. In this way, since the vibration pickup unit is arranged outside the sealing casing, the vibration pickup casing is easily subjected to an abnormal external force, which affects the performance of the vibration pickup film, for example, the vibration pickup casing is easily deformed by the external force, thereby affecting the performance of the vibration pickup film.

SUMMARY

The main purpose of the present disclosure is to provide a vibration sensor module, aiming to solve the technical problem in the related art that the vibration pickup casing of the vibration pickup unit is easily affected by the abnormal external force.

To solve the above problem, the present disclosure provides a vibration sensor module, including: a substrate, a first casing, a vibration pickup unit, and a sensor unit.

The first casing is provided with an open end, the open end of the first casing is arranged on the substrate, the first casing and the substrate are enclosed to form a sealing chamber, and the first casing includes a first top plate opposite to the substrate. The vibration pickup unit is arranged in the sealing chamber, the vibration pickup unit includes a second casing with an open end and an elastic vibration pickup member arranged in the second casing, the open end of the second casing is arranged on the substrate or the first top plate, and the second casing is provided with a vibration transmission through hole. The sensor unit includes a sensor chip arranged on an outer surface of the second casing, and a back cavity of the sensor chip corresponds to the vibration transmission through hole.

In an embodiment, the vibration sensor module is configured to detect a voiceprint vibration from a bone.

In an embodiment, the second casing includes a second top plate opposite to the substrate or the first top plate, the vibration transmission through hole is opened on the second top plate, and the sensor chip is arranged on the outer surface of the second top plate.

In an embodiment, the sensor unit further includes an application specific integrated circuit (ASIC) chip electrically connected to the sensor chip, the ASIC chip is arranged on the outer surface of the second top plate, or the ASIC chip is arranged on the substrate.

In an embodiment, the ASIC chip is electrically connected to the substrate through a connecting cable.

In an embodiment, the vibration pickup unit further includes a vibration regulator arranged on the elastic vibration pickup member.

In an embodiment, the elastic vibration pickup member is a vibration film.

In an embodiment, the elastic vibration pickup member includes:

a mounting ring provided on a wall of the second casing;
a vibration pickup piece located in the mounting ring and spaced apart from the mounting ring;
a connecting arm connecting the mounting ring and the vibration pickup piece; and
an elastic sealing film arranged in a gap between the mounting ring and the vibration piece,
wherein the vibration regulator is arranged on the vibration pickup piece.

In an embodiment, the substrate is a main control panel of an electronic device.

In an embodiment, the first casing is made of metal; and/or
the first casing is provided with a vent hole.

The present disclosure also provides an electronic device, including the vibration sensor module.

In the present disclosure, the first casing and the substrate are enclosed to form the sealing chamber, the vibration pickup unit is arranged in the sealing chamber, and the vibration pickup unit can be protected to prevent an abnormal external force directly acting on the second casing, so as to avoid affecting the performance of the elastic vibration pickup member. Moreover, the sensor chip is arranged on the outer surface of the second casing, which reduces the requirement for the first casing without making the first casing and the substrate form a three-layer printed circuit board (PCB) structure, thereby reducing the cost.

Especially, the open end of the second casing is arranged on the substrate, which further improves the protection effect to the vibration pickup unit, and keeps the first casing away from the vibration-sensitive position, thereby improving the reliability of the elastic vibration pickup member.

BRIEF DESCRIPTION OF THE DRAWINGS

In order to illustrate the technical solutions in the embodiments of the present disclosure or in the related art more clearly, the following briefly introduces the accompanying drawings required for the description of the embodiments or prior art. Obviously, the drawings in the following description are only part of embodiments of the present disclosure. For those of ordinary skill in the art, other drawings can also be obtained according to the structures shown in these drawings without any creative effort.

Figure 1:
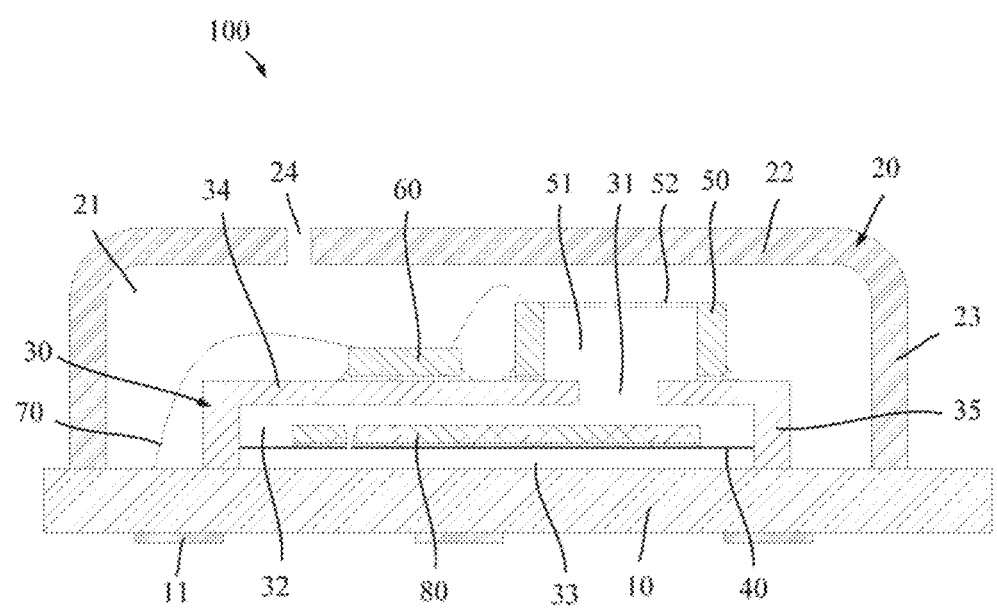
FIG. 1 is a structural schematic view of a vibration sensor module according to an embodiment of the present disclosure.

The achievement of the purpose of the present disclosure, functional characteristics and advantages will be further described with reference to the accompanying drawings in conjunction with embodiments.

DETAILED DESCRIPTION OF THE EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

It should be noted that if there are directional indications, such as up, down, left, right, front, back, etc, involved in the embodiments of the present disclosure, the directional indications are only used to explain a certain posture as shown in the accompanying drawings. If the specific posture changes, the directional indication also changes accordingly.

In addition, if there are descriptions related to "first", "second", etc. in the embodiments of the present disclosure, the descriptions of "first", "second", etc. are only for the purpose of description, and should not be construed as indicating or implying relative importance or implicitly indicates the number of technical features indicated. Thus, a feature delimited with "first", "second" may expressly or implicitly include at least one of that feature. Besides, the meaning of "and/or" appearing in the disclosure includes three parallel scenarios. For example, "A and/or B" includes only A, or only B, or both A and B. In addition, the technical solutions between the various embodiments can be combined with each other, but must be based on the realization by those of ordinary skill in the art. When the combination of technical solutions is contradictory or cannot be realized, it should be considered that the combination of such technical solutions does not exist or fall within the scope of protection claimed in this disclosure.

The present disclosure provides a vibration sensor module 100 and an electronic device. The vibration sensor module 100 is applied in the electronic device, the electronic device can be but not limited to a head-mounted equipment, an earphone, a smart watch, a smart bracelet, a vehicle-mounted noise reduction equipment or a vibration sensing device known by those skilled in the art.

In an embodiment of the present disclosure, referring to FIG. 1 to FIG. 4, the vibration sensor module 100 includes: a substrate 10, a first casing 20, a vibration pickup unit and a sensor unit.

The first casing 20 is provided with an open end, the open end of the first casing 20 is arranged on the substrate 10, and the first casing 20 and the substrate 10 are enclosed to form a sealing chamber 21, and the first casing 20 includes a first top plate 22 arranged opposite to the substrate 10.

The vibration pickup unit is arranged in the sealing chamber 21, the vibration pickup unit includes a second casing 30 with an open end and an elastic vibration pickup member 40 arranged in the second casing 30, the open end of the second casing 30 is arranged on the substrate 10 or the first top plate 22, and the second casing 30 is provided with a vibration transmission through hole 31.

The sensor unit includes a sensor chip 50 arranged on an outer surface of the second casing 30, and the back cavity 51 of the sensor chip 50 corresponds to the vibration transmission through hole 31.

Specifically, the substrate 10 is a circuit board, such as a printed circuit board (PCB).

Referring to FIG. 1 to FIG. 4, the first casing 20 also includes a first surrounding plate 23, the first top plate 22 is arranged at an end of the first surrounding plate 23, and an open end is formed at another end the first surrounding plate 23.

Specifically, referring to FIG. 1 to FIG. 4, the elastic vibration pickup member 40 is arranged on a peripheral wall of the second casing 30, so that a space in the second casing 30 is divided into a first cavity 32 and a second cavity 33, the first cavity 32 and the second cavity 33 are respectively arranged on two sides of the elastic vibration pickup member 40, and the first cavity 32 is communicated with the back cavity 51 of the sensor chip 50 through the vibration transmission through hole 31.

During work, the elastic vibration pickup member 40 is used for collecting a vibration of an outside world, such as a wearer or other vibration sources, to vibrate and instigate the gas in the first cavity 32, the vibration transmission through hole 31 and the back cavity 51 of the sensor chip 50 vibrate to transmit the vibration to the sensor chip 50, that is, to vibrate a sensing film 52 of the sensor chip 50, and the sensor chip 50 generates an electric signal.

In an embodiment, the first casing 20 and the substrate 10 are enclosed to form the sealing chamber 21, the vibration pickup unit is arranged in the sealing chamber 21, so that the vibration pickup unit can be protected, the abnormal external force is prevented directly acting on the second casing 30, and a performance of the elastic vibration pickup member 40 is ensured.

Moreover, the sensor chip 50 is arranged on the outer surface of the second casing 30, a requirement for the first casing 20 can be reduced without making the first casing 20 and the substrate 10 form the three-layer PCB structure, that is, the first top plate 22, the first surrounding plate 23 and the base plate 10 are all PCBs, thereby reducing costs.

In one embodiment of the present disclosure, referring to FIG. 1, the open end of the second casing 30 is arranged on the substrate 10. In this way, a protection effect of the vibration pickup unit can be further improved, the first casing 20 can be kept away from the vibration-sensitive position, and a reliability of the elastic vibration pickup member 40 can be improved. For example, a deformation of the second casing 30 resulting from the external force during assembly can be avoided, so as to avoid affecting the elastic vibration pickup member 40.

Figure 2:
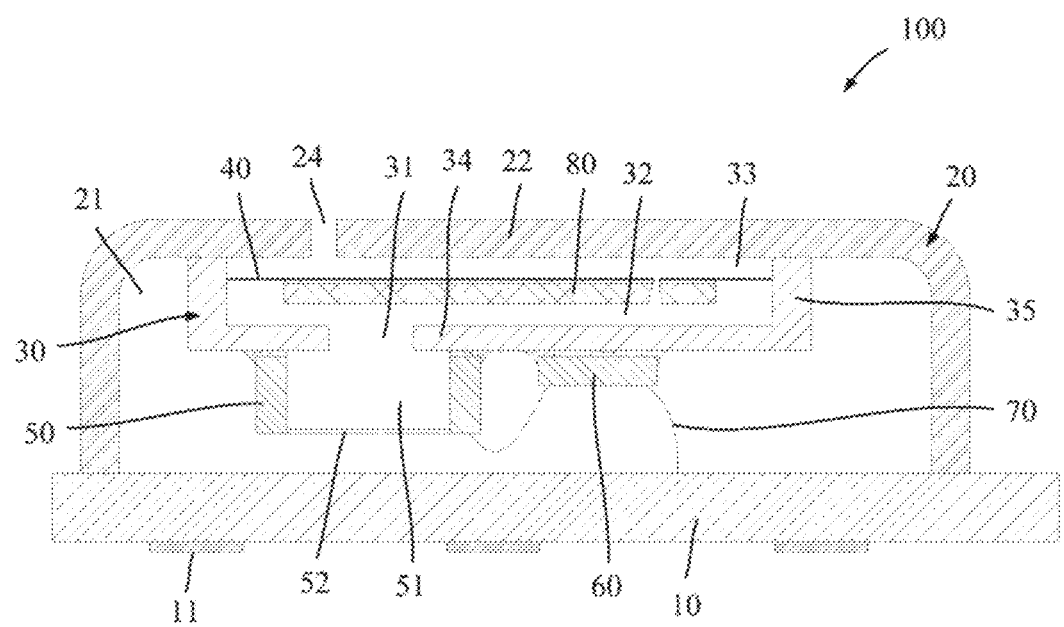
FIG. 2 is a structural schematic view of the vibration sensor module according to another embodiment of the present disclosure.

In an embodiment of the present disclosure, referring to FIG. 2, the open end of the second casing 30 is arranged on the first top plate 22.

Referring to FIG. 1 to FIG. 4, the first casing 20 is provided with a vent hole 24, and the vent hole 24 is used for pressure relief when the vibration sensor module 100 is assembled. In one embodiment, the vent hole 24 is opened on the first top plate 22.

The vent hole 24 is used to communicate an internal space of the vibration sensor module 100 with the external environment, so that when the vibration sensor module 100 is assembled, a failure of the sensor chip 50 resulting from an air pressure difference between the inner and outer space of the first casing 20 can be avoided.

However, when the vibration sensor module 100 is applied, that is, when the vibration sensor module 100 is applied to an electronic device, the vent hole 24 needs to be blocked so as not to affect a performance of the vibration sensor module 100. In an embodiment, the vent hole 24 may be blocked by sealing glue, bonding sealing tape, or adding a sealing plug.

Figure 4:
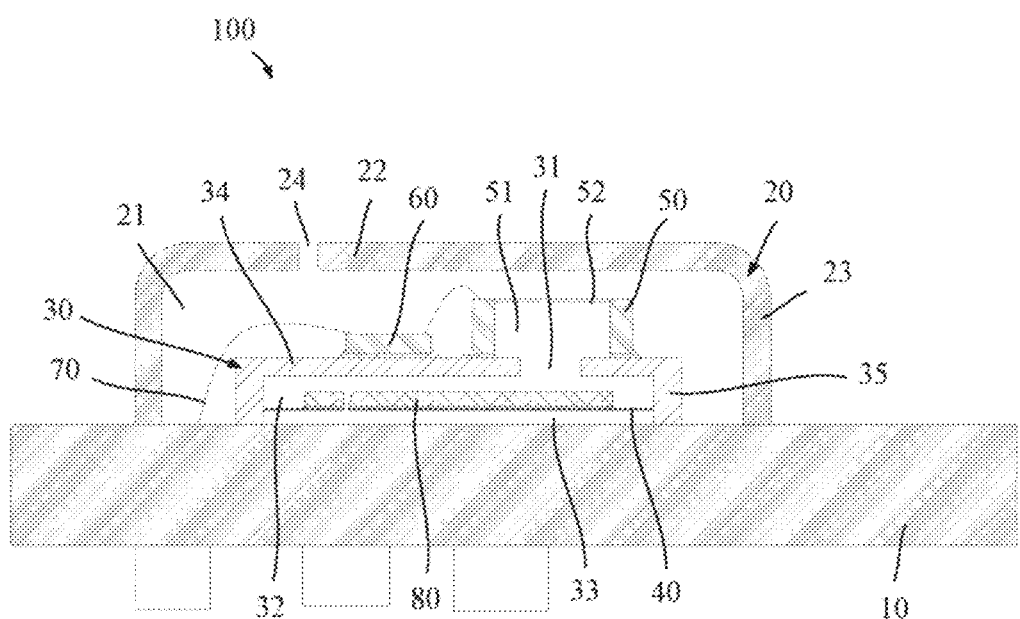
FIG. 4 is a structural schematic view of the vibration sensor module according to still another embodiment of the present disclosure.

It should be noted that, referring to FIG. 1 and FIG. 4, when the open end of the second casing 30 is arranged on the substrate 10, the vent hole 24 can be kept away from the vibration-sensitive position, thereby improving the reliability of the elastic vibration pickup member 40. Moreover, when the vent hole 24 is sealed with the sealing glue, the sealing glue can be prevented from dripping onto the elastic vibration pickup member 40, so as to avoid affecting the operation of the elastic vibration pickup member 40.

In an embodiment, the vent hole 24 can be arranged as a single relative large through hole, or can include a plurality of micro-holes. In one embodiment, an effective air leakage area of the vent hole 24 can be greater than or equal to 5000 square microns.

The vibration sensor module 100 of the present disclosure simplifies a product structure, avoids the three-layer plate structure, reduces the cost, and improves the sealing reliability. Moreover, the first casing 20 and the vent hole 24 can be kept away from the vibration-sensitive position, thereby improving the reliability of the elastic vibration pickup member 40.

Further, the first casing 20 is a metal casing, thus the first casing 20 is provided with a stronger shielding effect.

Referring to FIG. 1, the second casing 30 includes a second top plate 34 opposite to the substrate 10 or the first top plate 22, the vibration transmission through hole 31 is opened on the second top plate 34, and the sensor chip 50 is arranged on the outer surface of the second top plate 34. Specifically, the second casing 30 also includes a second surrounding plate 35, the second top plate 34 is arranged at one end of the second surrounding plate 35, and an opening is formed at another end of the second surrounding plate 35. Specifically, the sensor chip 50 is arranged on an outer surface of the second top plate 34 through a sealing glue.

It can be understood that when an open end of the second casing 30 is arranged on the substrate 10, the second top plate 34 is arranged opposite to the substrate 10. When the open end of the second casing 30 is arranged on the first top plate 22, the second top plate 34 is opposite to the first top plate 22.

In this way, the vibration of the elastic vibration pickup member 40 can be easily transmitted to the sensing film 52 of the sensor chip 50, thereby improving the performance of the vibration sensor module 100.

In other embodiments, the sensor chip 50 can be arranged at other positions, such as the outer surface of the second surrounding plate 35.

Further, referring to FIG. 1, the sensor unit also includes an application specific integrated circuit (ASIC) chip, the ASIC chip is electrically connected to the sensor chip 50 to process the electrical signal generated by the sensor chip 50.

In an embodiment, the ASIC chip 60 can be arranged in the sealing chamber 21, or can be arranged outside the sealing chamber 21, such as being directly arranged on a main control panel of the electronic device. In an embodiment of the present disclosure, the ASIC chip 60 is arranged in the sealing chamber 21. In other embodiments of the present disclosure, referring to FIG. 1 and FIG. 2, the ASIC chip 60 is arranged on the outer surface of the second casing 30. In one embodiment, the ASIC chip 60 is arranged on the outer surface of the second top plate 34. In an embodiment of the present disclosure, referring to FIG. 3, the open end of the second casing 30 is arranged on the first top plate 22, the sensor chip 50 is arranged on the outer surface of the second top plate 34, and the ASIC chip 60 is arranged on the substrate 10.

Further, referring to FIG. 1 to FIG. 4, the ASIC chip 60 is electrically connected to the substrate 10 through a connecting cable 70. In this way, the sensor chip 50 can be electrically connected to the substrate 10.

Further, referring to FIG. 1 to FIG. 4, the vibration pickup unit also includes a vibration regulator 80 arranged on the elastic vibration pickup member 40.

The vibration regulator 80 is used to adjust a vibration of the elastic vibration pickup member 40, so that the vibration of the elastic vibration pickup member 40 can be better matched with the wearer's bone vibration signal, thereby improving the sensitivity of the vibration sensor module 100. Moreover, the vibration regulator 80 vibrates together with the elastic vibration pickup member 40, so that a vibration quality of the elastic vibration pickup member 40 can be increased, which can effectively avoid an interference from external factors, such as a sound wave.

In an embodiment, the vibration regulator 80 can be bonded to the elastic vibration pickup member 40 by the glue.

In an embodiment, the vibration regulator 80 can be arranged on any side of the elastic vibration pickup member 40, that is, the vibration regulator 80 can be arranged in the first cavity 32 or the second cavity 33.

In one embodiment, the vibration regulator 80 is a mass.

Further, the elastic vibration pickup member 40 is a vibration film, and the vibration regulator 80 is arranged on the vibration film. The vibration film can be a film with an elastic deformation ability, including but not limited to a plastic film, a paper film, a metal film, or a biological film. Moreover, the vibration film can be a single-layer or a multi-layer structure. Moreover, the vibration film can be made of a single material or a composite of different materials.

In other embodiments, the elastic vibration pickup member 40 can also be other structures. In an embodiment, the elastic vibration pickup member 40 includes a mounting ring arranged on a wall of the second casing 30, a pickup piece in the mounting ring and spaced from the mounting ring, a connecting arm connecting the mounting ring and the pickup piece, and an elastic sealing film in a gap between the mounting ring and the pickup piece, and the vibration regulator 80 is arranged on the vibration pickup piece.

In one embodiment, the sensor chip 50 can be a microphone chip or a pressure sensor chip 50, that is, the sensor unit can be a microelectro mechanical system (MEMS) microphone or a MEMS pressure sensor. In this way, a design difficulty of the vibration sensor module 100 can be reduced.

Figure 3:
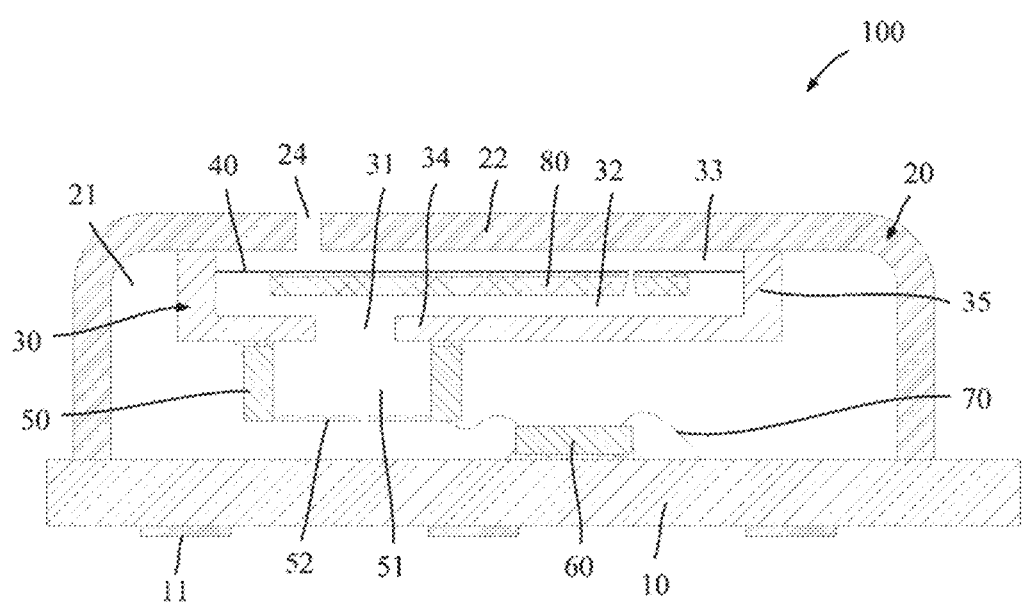
FIG. 3 is a structural schematic view of the vibration sensor module according to yet another embodiment of the present disclosure.

Further, referring to FIG. 1 to FIG. 3, a side of the substrate 10 facing away from the first casing 20 is provided with an electrical connecting portion 11. The electrical connecting portion 11 is used to be electrically connected with the main control panel of the electronic device, so as to realize an electrical connection between the main control panel and the vibration sensing module 100. When the vibration sensor module 100 is assembled, the substrate 10 is bonded on a surface of the main control panel, and the electrical connecting portion 11 is electrically connected to the electric control plate, so that the sensor chip 50 is electrically connected to an external circuit, that is, a circuit of the electronic device.

In an embodiment, referring to FIG. 4, the substrate 10 can also be the main control panel of the electronic device. In this way, not only can the cost be reduced, but also an overall height of the vibration sensor module 100 can be reduced, thereby facilitating a miniaturization design of the electronic device, especially for a small and exquisite electronic device such as an earphone.

The above descriptions are only embodiments of the present disclosure, and are not intended to limit the scope of the present disclosure. Under the inventive concept of the present disclosure, any equivalent structural transformations made by using the contents of the description and drawings of the present disclosure, or direct/indirect disclosures in other related technical fields are included in the scope of the present disclosure.

What is claimed is:

1. A vibration sensor module, comprising:
    a substrate;
    a first casing, wherein the first casing is provided with an open end, the open end of the first casing is arranged on the substrate, the first casing and the substrate are enclosed to form a sealing chamber, and the first casing comprises a first top plate opposite to the substrate;
    a vibration pickup unit, wherein the vibration pickup unit is arranged in the sealing chamber, the vibration pickup unit comprises a second casing with an open end and an elastic vibration pickup member arranged in the second casing, the open end of the second casing is arranged on the substrate or the first top plate, and the second casing is provided with a vibration transmission through hole; and
    a sensor unit, wherein the sensor unit comprises a sensor chip arranged on an outer surface of the second casing, and a back cavity of the sensor chip corresponds to the vibration transmission through hole,
    wherein the elastic vibration pickup member is configured for collecting a vibration of an outside world to vibrate, thereby instigating gas in the vibration transmission through hole and the back cavity of the sensor chip to vibrate, transmitting the vibration to the sensor chip to make the sensor chip generate an electric signal.

2. The vibration sensor module of claim 1, wherein the vibration sensor module is configured to detect a voiceprint vibration from a bone.

3. The vibration sensor module of claim 2, wherein the second casing comprises a second top plate opposite to the substrate, the vibration transmission through hole is opened on the second top plate, and the sensor chip is arranged on the outer surface of the second top plate.

4. The vibration sensor module of claim 3, wherein the sensor unit further comprises an application specific integrated circuit (ASIC) chip electrically connected to the sensor chip, the ASIC chip is arranged on the outer surface of the second top plate.

5. The vibration sensor module of claim 4, wherein the ASIC chip is electrically connected to the substrate through a connecting cable.

6. The vibration sensor module of claim 1, wherein the vibration pickup unit further comprises a vibration regulator arranged on the elastic vibration pickup member.

7. The vibration sensor module of claim 6, wherein the elastic vibration pickup member is a vibration film.

8. The vibration sensor module of claim 6, wherein the elastic vibration pickup member comprises:
    a mounting ring provided on a wall of the second casing;
    a vibration pickup piece located in the mounting ring and spaced apart from the mounting ring;
    a connecting arm connecting the mounting ring and the vibration pickup piece; and
    an elastic sealing film arranged in a gap between the mounting ring and the vibration piece,
    wherein the vibration regulator is arranged on the vibration pickup piece.

9. The vibration sensor module of claim 1, wherein the substrate is a main control panel of an electronic device.

10. The vibration sensor module of claim 1, wherein:
    the first casing is made of metal; and/or
    the first casing is provided with a vent hole.

11. An electronic device, comprising the vibration sensor module of claim 1.

* * * * *